Patented Dec. 9, 1941

2,265,212

UNITED STATES PATENT OFFICE 2,265,212

THIOFORMAMIDE COMPOUNDS

Kurt Westphal and Hans Andersag, Wuppertal-Elberfeld, Germany, assignors to Winthrop Chemical Company, Inc., New York, N. Y., a corporation of New York No Drawing. Application May 9, 1939, Serial No. 272,600. In Germany May 12, 1938

10 Claims. (Cl. 260—251)

This invention relates to a process of manufacturing thioformamides.

Thioformamide compounds have been hitherto prepared by various methods. According to one of the most usual methods thioformamide compounds are obtained by heating formamide compounds with phosphorus pentasulfide. This method, however, is not useful in every case, for instance cannot be used if the formamide compound which is to be reacted with phosphorus pentasulfide simultaneously contains further groups which likewise react with phosphorus pentasulfide or which are not sufficiently stable when treated with phosphorus pentasulfide.

The present invention provides for a process by which thioformamide compounds are obtained in a particularly favorable manner. In accordance with the present invention thioformamide compounds, substituted at the nitrogen atom by an organic radical, are obtained by reacting upon an amine containing at least one hydrogen atom in the amino group with thioformamide. It is surprising that the reaction which takes place with splitting off of ammonia performs in general even at ordinary temperature. Hence the new reaction has the advantage when compared with the known reactions that practically no by-reactions occur. The reaction preferably is carried out in the presence of a solvent or diluent which is inert to the reacting components, such as water, alcohols, ether, dioxane and the like. The reaction may also be performed in such a manner that the thioformamide is caused to form from formamide and phosphorus pentasulfide in the presence of the respective amine and, if desired, of an inert solvent and with the addition of an acid binding agent. The most various primary and secondary organic amines, particularly also polyamines, of the aliphatic, cycloaliphatic, aromatic, araliphatic and heterocyclic series, may be used for the above described reaction. The amino group itself may be present in heterocyclic linkage, as for instance in pyrrolidine and piperidine. The reaction is most satisfactory with the strongly basic amines, containing an aliphatically bound amino group, such as methyl- and dimethyl-amine, ethyl- and diethyl-amine, ethylenediamine, aminoethanol, propyl- and hydroxypropyl-amine, butylamine, pentylamines, cyclopentylamine, hexylamines, cyclohexylamine, octylamine, benzylamine, aminomethyl-pyridines, aminomethyl-pyrimidines and so on. Suitable aromatic and heterocyclic amines are for instance aniline, toluidine, phenylenediamine, naphtylamine, 3-amino-pyridine and amino quinolines. The amines may be used for the reaction as such or in the form of their salts.

The thioformamide compounds thus obtainable are in part used as initial materials for chemical syntheses or may be in part used as such for technical purposes.

The invention is illustrated by the following examples without being restricted thereto:

Example 1

6 grams of formamide, 6 grams of phosphorus pentasulfide and 100 ccs. of dioxane are vigorously stirred for 12 hours. The dioxane-solution is poured off and the solvent is removed therefrom under reduced pressure at 40° C. The residue containing the thioformamide formed is dissolved in 30 ccs. of water, the solution is filtered and mixed with a solution of 8.5 grams of piperidine in 20 ccs. of water. After 12 hours' storing the solution is acidified with hydrochloric acid and extracted with methylene chloride. After drying by way of sodium sulfate and removing of the solvent the N-thioformyl-piperidine formed distils as a yellow oil under 14 mms. pressure at 145° C., which solidifies in the cold.

The same compound can be obtained when mixing 6.1 grams of thioformamide and 8.5 grams of piperidine without a solvent while thoroughly cooling. After 12 hours' storing the solution is acidified with hydrochloric acid. The insoluble oil is extracted with ether, the ethereal solution dried, freed from ether and the residue is fractionated. The N-thioformyl-pyrrolidine boiling under 9 mms. pressure at 132 to 134° C. is obtained in an analogous manner.

Example 2

A solution of 12.7 grams of thioformamide obtained as described in Example 1 in 100 ccs. of alcohol is mixed with a solution of 15 grams of diethylamine in 50 ccs. of water. After some hours the yellow solution is evaporated to dryness under reduced pressure. The residue is extracted with ether, the ethereal solution dried with sodium sulfate and the ether distilled off. The residue boils under 15 mms. pressure at 112–113° C. The N-diethyl-thioformamide is obtained as a yellow oil.

The diethyl-thioformamide can also be obtained when performing the reaction, as described in Example 1, paragraph 2, without a solvent.

In an analogous manner the following products are obtained:

N,N'-dithioformyl-ethylenediamine melting at 147° C., N-thioformylamidoethanol boiling under 1.5 mms. pressure at 135° C., N-thioformyl-dimethylamine boiling under 12 mms. pressure at 97° C., N-thioformyl-ethylamine boiling under 14 mms. pressure at 125° C., the N-isoamyl-thioformamide boiling under 8 mms. pressure at 140° C., the N-thioformyl-benzylamine melting at 65° C. and the N-thioformyl-isohexylamine boiling under 2 mms. pressure at 125° C.

Example 3

A mixture of 11.3 grams of phosphorus pentasulfide, 250 ccs. of anhydrous ether and 11.3 grams of formamide is shaken for 12 hours. Thereupon the ethereal solution is poured off and freed from ether under reduced pressure at room temperature. The residue is dissolved in 100 ccs. of alcohol, filtered and mixed with a solution of 26 grams of 2-methyl-4-amino-5-aminomethyl-pyrimidine in 150 ccs. of alcohol. After a short time crystallization begins with a slight increase of temperature. After some hours the solution is filtered with suction and the crystals recrystallized from dilute alcohol. The 2-methyl-4-amino-5-thioformamido-methyl-pyrimidine is obtained in white crystals melting at 193° C.

The same substance is obtainable when dissolving the components in water or in dilute dioxane instead of alcohol and mixing the solutions.

The same product can be obtained when using instead of 26 grams of 2-methyl-4-amino-5-aminomethyl-pyrimidine in 150 ccs. of alcohol a solution of 32 grams of its carbonate in 200 ccs. of water.

Example 4

An alcoholic solution of thioformamide, prepared according to Example 1 from 2.26 grams of formamide, 50 ccs. of dioxane and 2.26 grams of phosphorus pentasulfide, is mixed with a solution of 3.5 grams of aniline in 40 ccs. of alcohol. After a 12 hours' storing the solution is evaporated to dryness under reduced pressure and extracted with dilute hydrochloric acid. The insoluble residue is extracted with dilute aqueous sodium hydroxide solution and the alkaline solution is acidified with acetic acid. The crystals precipitated are filtered with suction and recrystallized from water. The N-thioformyl-aniline is obtained in white crystals melting at 138° C.

In an analogous manner the N, N'-dithioformyl-meta-phenylenediamine melting at 147° C. is obtained.

Example 5

A crude thioformamide preparation obtained according to Example 4 is dissolved in 20 ccs. of chloroform and mixed with a solution of 5.4 grams of 6-aminoquinoline in chloroform. After 12 hours the solution of chloroform is shaken out with dilute aqueous sodium hydroxide solution and the latter is slightly acidified with acetic acid. The crystals precipitated are filtered with suction and recrystallised from acetone. White crystals of the 6-thioformylamido-quinoline are obtained, melting at 238° C.

We claim:

1. The process of manufacturing thioformamide compounds by reacting upon a halogen-free amine containing at least one hydrogen atom in the amino-group with thioformamide.

2. The process of manufacturing thioformamide compounds by reacting upon a halogen-free amine the amino group of which is aliphatically bound and contains at least one hydrogen atom, with thioformamide.

3. The process of manufacturing thioformamide compounds by reacting upon a halogen-free primary amine, the amino group of which is aliphatically bound, with thioformamide.

4. The process of manufacturing thioformamide compounds by reacting upon a 5-aminomethyl-pyrimidine with thioformamide.

5. The process of manufacturing thioformamide compounds by reacting upon 2-methyl-4-amino-5-aminomethyl-pyrimidine with thioformamide.

6. Process as claimed in claim 1 in which the reaction is carried out in the presence of a diluent which is inert to the reacting components.

7. Process as claimed in claim 2 in which the reaction is carried out in the presence of a diluent which is inert to the reacting components.

8. Process as claimed in claim 3 in which the reaction is carried out in the presence of a diluent which is inert to the reacting components.

9. Process as claimed in claim 4 in which the reaction is carried out in the presence of a diluent which is inert to the reacting components.

10. Process as claimed in claim 5 in which the reaction is carried out in the presence of a diluent which is inert to the reacting components.

KURT WESTPHAL.
HANS ANDERSAG.